United States Patent

Harmony

[11] 3,970,251
[45] July 20, 1976

[54] PIPE INSERTABLE EMITTER FOR IRRIGATION SYSTEMS

[75] Inventor: Richard C. Harmony, Tucson, Ariz.

[73] Assignee: Harmony Emitter Company, Inc., Tucson, Ariz.

[22] Filed: Mar. 6, 1975

[21] Appl. No.: 555,945

[52] U.S. Cl. .............................. 239/107; 138/46; 239/534; 239/542; 239/547
[51] Int. Cl.² .............................................. B05B 15/02
[58] Field of Search ........... 239/542, 547, 534, 535, 239/107, 108, 109; 138/44, 45, 46; 215/327

[56] References Cited
UNITED STATES PATENTS

| 2,543,775 | 3/1951 | Gora | 215/327 |
| 2,775,984 | 1/1957 | Dahl | 138/45 |
| 2,961,109 | 11/1960 | Podesta | 215/327 |
| 3,546,884 | 12/1970 | Timpe | 239/534 X |
| 3,693,888 | 9/1972 | Rondas et al. | 239/547 X |
| 3,777,980 | 12/1973 | Allport | 239/542 X |
| 3,779,468 | 12/1973 | Spencer | 239/547 X |

*Primary Examiner*—John J. Love
*Assistant Examiner*—Michael Mar
*Attorney, Agent, or Firm*—Cahill, Sutton & Thomas

[57] ABSTRACT

An emitter insertable through the wall of a water pipe having a pair of striated skirts depending from opposed edges of the emitter outlet for irrigating soil at a constant rate of water flow despite variations in water pressure within the water pipe.

9 Claims, 4 Drawing Figures

PIPE INSERTABLE EMITTER FOR IRRIGATION SYSTEMS

The present application is related to a patent application entitled "EMITTER FOR IRRIGATION SYSTEMS," filed Dec. 16, 1974, and assigned Ser. No. 532,869 now U.S. Pat. No. 3,917,169, which in turn is a continuation-in-part of a patent application entitled "EMITTER FOR IRRIGATION SYSTEMS," filed on Apr. 1, 1974, and assigned Ser. No. 456,617 now U.S. Pat. No. 3,899,136; all of the above applications describe inventions made by the present inventor.

The present invention relates to water dispersing apparatus and, more particularly, to emitters for irrigating soil.

Irrigation devices of various types have been available for a number of years. These devices may generally be classified into one of two categories: those intended for home use; and, those intended for industrial application.

The devices intended for home use are usually attachable to a water hose and include a multi-port pressure reducing chamber. The water outflow is at a sufficiently low rate so as not to erode the soil from about the plant roots. The rate of water flow is, however, dependent upon the water pressure within the water hose. Therefore, some judgment has to be exercised in regulating the flow of water through the water hose. Where clean water is used, no problems generally develop. However, if the water contains particulate matter of greater than microscopic size, one or more ports within the device generally become clogged and cause a resulting increase in the rate of water flow through the remaining ports. The force of the increased water flow can and often does cause erosion of the surrounding soil.

The devices intended for industrial use are generally connected to a source of irrigation water, that is, water which does contain suspended particulate matter. To overcome the clogging effects of the particulate matter, the outlet ports in these devices are generally of resilient material to permit them to expand as necessary to pass the particulate matter. Where a port expands to pass the particulate matter, the rate of water flow therethrough simultaneously increases. The increased water flow tends to reduce the water pressure within the common envelope feeding the devices and results in a reduction of water flow through the remaining ports. Thereby, uneven irrigation often results. Due to aging, the resilient material may not be able to contract to its initial size and thereby contributes to an uneven rate of water discharge.

Where a plurality of non-self-regulating water discharge devices or ports are disposed along a length of hose, a substantial pressure gradient exists through the length of the hose. The pressure gradient, in turn, tends to cause a proportional water outflow from the devices or ports. Such variation in water flow produces non-uniform irrigation along the length of the hose.

The following patents are representative of the state of the art in soakers and irrigation devices: U.S. Pat. Nos. 2,851,306; 3,698,195; 3,303,800; 3,116,019; 3,685,735; 3,788,544; 3,667,685; 3,080,124; 3,221,996; 3,552,654; 3,767,124; 3,780,946; 3,779,468; 1,366,685; and, 3,777,987.

It is therefore a primary object of the present invention to provide an emitter which delivers a constant flow of water despite variations in the water pressure.

Another object of the present invention is to provide an irrigation system having a plurality of emitters selectively insertable along a water distribution line, which emitters are self regulating to provide a constant water discharge rate from each emitter regardless of the location of the emitter along the line.

Yet another object of the present invention is to provide a replaceable emitter for irrigation systems and which is useable with irrigation water having particulate matter suspended therein.

A further object of the present invention is to provide a replaceable emitter which requires no adjustments to control the rate of water flow therethrough despite variations in water pressure.

A yet further object of the present invention is to provide a self regulating emitter which is selectively attachable to the water distribution pipes of an irrigation system.

A still yet further object of the present invention is to provide a self flushing and non-clogging emitter having replaceable elements.

A still further object of the present invention is to provide an inexpensive, easily manufacturable emitter.

These and other objects of the present invention will become apparent to those skilled in the art as the description thereof proceeds.

The present invention may be described with greater specificity and clarity with reference to the following drawings, in which.

Figure 1:
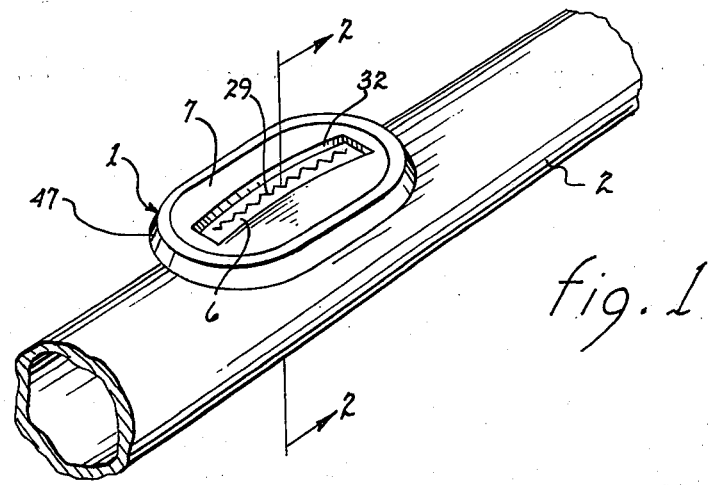
FIG. 1 illustrates an emitter embodying the principles of the present invention, which emitter is inserted within the wall of a water distribution pipe of an irrigation system.
Figure 2:
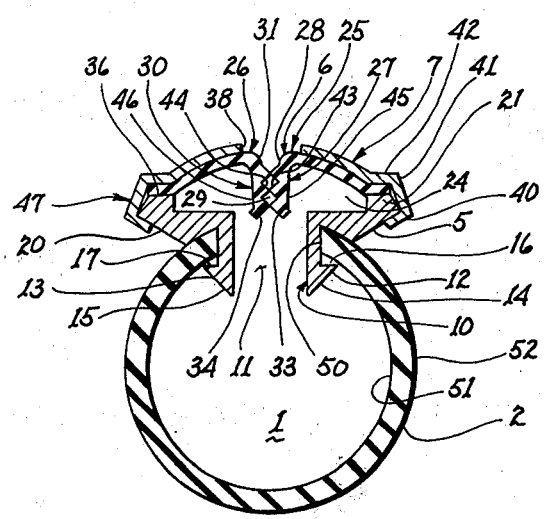
FIG. 2 illustrates a cross-section of the emitter shown in FIG. 1 and taken along lines 2—2.

An emitter 1 constructed in accordance with the principles of the present invention is illustrated in FIG. 1. The emitter is inserted within a water distribution line 2 at selected intervals. The water distribution line is representative of a plurality of water distribution lines forming an irrigation system. The water distribution line may be flexible or rigid and formed of metallic, plastic, or other materials, the selection of which has no appreciable effect upon the emitter and is determined by other criteria.

The constructional details of emitter 1 will be described with joint reference to FIGS. 1–4. Emitter 1 is formed of three elements: a base 5, a split diaphragm 6 and a cap 7.

Base 5, which may be generally oval or eliptically shaped in planform, is constructed with a downwardly extending shroud 10. The shroud defines a water passageway 11 from the water distribution line. Lips 12 and 13 extend about the lower periphery of shroud 10. The lower surface 14, 15 of each lip 12, 13 respectively, slants downwardly and inwardly and the upper surface 16, 17 of each lip extends lateral to shroud 10 such that the cross-section of the lower edge of the shroud defines a prong. The lower surface 20 of base 5, extending lateral to shroud 10, is configured to mate with the adjacent surface of the water distribution line.

The split diaphragm 6 is defined by a pair of curvilinear diaphragm-line elements 25, 26 of flexible material, which elements are in contact with one another along their respective edges 28 and 31 located at the longitudinal axis of the emitter. Each element defines approximately one-half of the diaphragm. Both elements, in combination with base 5, define a chamber 24, which chamber is in fluid communication with the water within water distribution line 2 through channel 10.

A skirt 27 depends downwardly from edge 28 of element 25 and a similar skirt 30 depends downwardly from edge 31 of element 26. When edges 28 and 31 are essentially adjacent one another such as during quiescent conditions, surfaces 33 and 34 of skirts 25 and 26, respectively, are also adjacent one another. Surfaces 33 and 34 are striated whereby a plurality of contact points exist therebetween and produce interstices of interleaved circuitous passages extending intermediate the skirts. Each striated surface may be formed by means of a plurality of parallel ridges with the ridges 43 of one surface being in non-alignment with the ridges 44 of the opposed surface.

Figure 3:
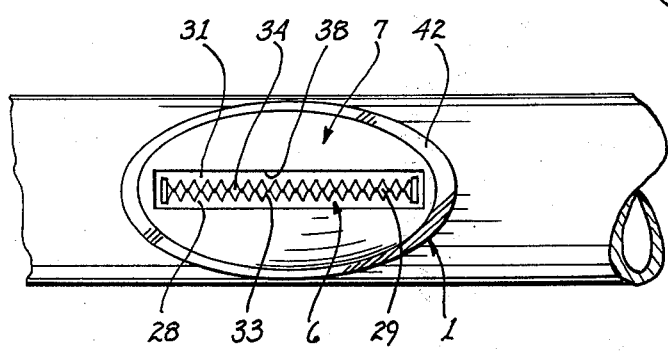
FIG. 3 illustrates a top view of the emitter shown in FIG. 1.
Figure 4:
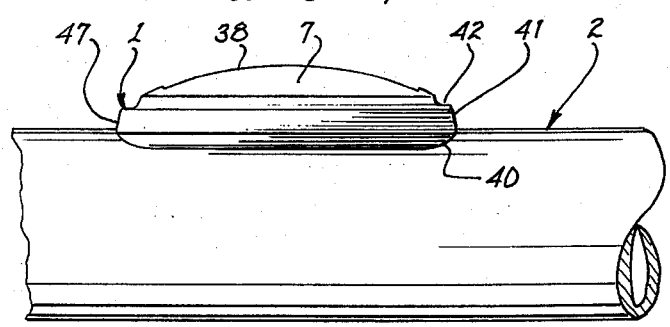
FIG. 4 illustrates a side view of the emitter shown in FIG. 1.

Diaphragm 6 may be formed of two segregated elements, or it may be formed from a single piece of material having a slit defining edges 28 and 31 as illustrated in FIG. 3. The periphery of the diaphragm is formed generally commensurate with the periphery of base 5. Moreover, the diaphragm includes a flat horizontal surface 35 which rests upon and mates with a similarly configured horizontal surface 36 of base 5.

Cap 7 is formed with a domed surface having a central slot 38 disposed therein, which slot is generally coincident to but larger than the slit intermediate elements 25 and 26. A peripheral flange of cap 7 extends downwardly to enclose the periphery of diaphragm 6 and base 5. Inwardly directed lip 40, in combination with edge 41 and seat 42 define a U-shaped channel 47 in cross-section. The dimensions of the U-shaped channel are such as to receive the edge of both diaphragm 6 and base 5. Lip 40, in combination with seat 42, exert a compressive force about the inserted base and diaphragm so as to retain the latter in place and form an essentially watertight seal therebetween.

Cap 7 is intended to be of resilient flexible material to allow lip 41 to be pried outwardly for replacement of the cap. Alternatively, the cap can be removed for replacement of diaphragm 6 should the latter become damaged.

The emitter of the present invention is attached to a water distribution line by developing a slot 50 therein, which slot corresponds to the dimensions of shroud 10.

Emitter 1 is mounted within slot 50 in the following manner. The lower edge of shroud 10 is positioned coincident with slot 50 and the emitter is forced downwardly. Downward movement of emitter 1 causes the shroud to deflect inwardly to accommodate passage of lips 12 and 13 adjacent the sides of slot 50. After lips 12 and 13 have passed through the slot or wall of the water distribution line 2, the lower edges of the shroud will expand laterally. The lateral expansion of the lower edge of the shroud will cause lips 12 and 13 to engage the inner surface 51 of the water distribution line. Simultaneously, surface 20 of base 5 will come into contacting relationship with the adjacent exterior surface 52 of the water distribution line. By carefully selecting the depth of shroud 10 and the spacing of lips 12 and 13 with respect to surface 20, the lips will tend to force base 5 onto the surface of the water distribution line adjacent slot 50 to maintain an effective water seal therebetween.

In operation, emitter 1 is inserted through a slot 50 into water distribution line 2. The water under pressure within the water distribution line will flow through passageway 11 within shroud 10, through passageway 29 (defined by skirts 27 and 20) and discharge through the water discharge outlet 32 defined by edges 28 and 31. Because of the non-aligned ridges 43, 44, the water flow intermediate skirts 27 and 30 will be random and turbulent. The randomness and turbulence of the water flow will establish a water pressure gradient from the input end to outlet 32 along surfaces 33, 34. Simultaneously, the water will also exert pressure upon surfaces 45 and 46 of skirts 27 and 30, respectively, forcing the skirts toward one another and restraining separation therebetween. Hence, the lateral expansion of skirts 27 and 30 induced by the water pressure gradient intermediate surfaces 33 and 34 is effectively countered by the water pressure acting upon surfaces 45 and 46 to prevent separation of the skirts in proximity to edges 28 and 31. That is, the skirts act as a bias means for regulating the size of passageway 29 and outlet 32. Thus, the rate of water discharge from emitter 1 is essentially a function of the striations upon surfaces 33 and 34 and is essentially independent of the water pressure within water distribution line 2.

More particularly, should the water pressure within water distribution line 2 vary at different locations of emitters 1, each emitter will accommodate such variation while providing an essentially constant rate of water discharge from each emitter. As stated above, the interstices or passages determine the water flow which will always occur regardless of the amount of water pressure within water distribution pipe 2. That is, an increase in water pressure intermediate skirts 27 and 30 would tend to laterally displace surfaces 33 and 34 from one another and thereby expand the passageways. Such expanded passageways would, of course, increase the water flow rate therethrough. The expansion, however, is inhibited by the simultaneous increase in water pressure adjacent surfaces 45 and 46 of skirts 28 and 31. The increase in water pressure will tend to maintain surfaces 33 and 34 adjacent one another. Due to the pressure gradient across the striated surfaces, the water pressure in proximity to edges 28 and 31 is substantially less than the water pressure within the water distribution line 2. The pressure differential may possibly slightly compress ridges 43 and 44 to reduce the size of the interstices. Whereby, the cross-section of the water discharge outlet is reduced in response to the increased mean pressure level within the water distribution line. Thus, a predetermined regulated water flow will occur through each emitter despite increases in the water pressure within water distribution line 2.

If the water within distribution line 2 is contaminated by suspended particulate matter, it is quite likely that the particulate matter would be forced intermediate skirts 27 and 30. Should the particulate matter be too large to flow freely through the interstices or passages, it may become lodged intermediate surfaces 33, 34. In order for the particulate matter to become lodged, it will have to exert a lateral force upon each of surfaces 33, 34. Such a lateral force will tend to displace the surfaces from one another. The increased displacement will increase the water flow rate in proximity thereto and tend to force the particulate matter through the outlet. Thus, emitter 1 is both self-cleaning and non-clogging.

By constructing emitter 1 from three disassembled parts, any part can be replaced at will should the part be damaged through handling or deteriorate with age. Moreover, the means for inserting each emitter renders it useable with any water distribution pipe having slots disposed therein. As it is within the province of those skilled in the pertaining art to develop a slot cutting tool, the emitters can be added at will to any existing irrigation systems. Or, an irrigation system can be laid out and slots cut therein for the emitters, as needed.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. An emitter insertable within a water distribution line for discharging water from the water distribution line at a constant rate despite changes in water pressure within the water distribution line, said emitter comprising:
   a. a base for conveying water from within the water distribution line and through the wall of the water distribution line, said base having a depending hollow shroud for penetrating the wall of the water distribution line and conveying water therefrom;
   b. an apertured diaphragm mounted upon said base for establishing a water discharge outlet from said emitter;
   c. bias means for maintaining a constant rate of water flow through said water discharge outlet despite variations in water pressure within said shroud, said bias means comprising a pair of opposed surfaces separable from one another for defining a single passageway for the water flow; and
   d. a cap for securing said diaphragm to said base, said cap including a slot disposed in proximity to said outlet for accommodating the discharge of water from said emitter; whereby, a constant rate of water discharge from the water distribution line will occur wherever said emitter is inserted into the water distribution line despite variations in water pressure within the water distribution line.

2. The emitter as set forth in claim 1 wherein the depending end of said shroud includes a laterally extending lip for engaging the inner wall of the water distribution pipe to retain said base in place.

3. The emitter as set forth in claim 2 wherein each side of said shroud is prong-like in cross-section.

4. The emitter as set forth in claim 3 wherein said lip is spaced apart from said base to exert a force upon the inner wall of the water distribution line and draw said base into sealing engagement with the outer surface of the water distribution line and prevent water leakage therebetween.

5. An emitter insertable within a water distribution line at a constant rate despite changes in water pressure within the water distribution line, said emitter comprising:
   a. a base for conveying water from within the water distribution line and through the wall of the water distribution line, said base having a depending hollow shroud for penetrating the wall of the water distribution line and conveying water therefrom, said shroud having a depending end with a laterally extending lip for engaging the inner wall of the water distribution pipe to retain said base in place;
   b. an apertured diaphragm mounted upon said base for establishing a water discharge outlet from said emitter;
   c. bias means for maintaining a constant rate of water flow through said water discharge outlet despite variations in water pressure within said shroud, said bias means comprising a pair of striated skirts depending from opposed respective edges of said outlet for defining a passageway from within said emitter and terminating at said outlet, said pair of striated skirts inducing random and turbulent water flow within said passageway to establish a pressure gradient therein; and
   d. a cap for securing said diaphragm to said base, said cap including a slot disposed in proximity to said outlet for accommodating the discharge of water from said emitter; whereby, a constant rate of water discharge from the water distribution line will occur wherever said emitter is inserted into the water distribution line despite variations in water pressure within the water distribution line.

6. The emitter as set forth in claim 5 wherein said base and said diaphragm define a chamber in fluid communication with the interior of the water distribution line through said shroud; whereby, the water pressure within said chamber is a function of the water pressure within the water distribution line.

7. The emitter as set forth in claim 6 wherein said striated skirts extend within said chamber; whereby, any change in water pressure within said chamber deflects said pair of skirts toward or apart from one another to vary the size of said passageway commensurate with the water pressure gradient within said passageway.

8. The emitter as set forth in claim 7 wherein said cap includes a U-shaped flange for engaging the periphery of both said base and said diaphragm.

9. The emitter as set forth in claim 5 wherein opposed surfaces of said striated skirts include a plurality of ridges disposed therein.

* * * * *